(12) United States Patent
Eatough

(10) Patent No.: US 7,035,274 B2
(45) Date of Patent: Apr. 25, 2006

(54) TECHNIQUES FOR STORING DATA ON MESSAGE QUEUING MIDDLEWARE SERVERS WITHOUT REGISTRATION OF THE SENDING APPLICATION

(75) Inventor: David Arthur Eatough, Provo, UT (US)

(73) Assignee: Intel Corporation, Santa Clara, CA (US)

( * ) Notice: Subject to any disclaimer, the term of this patent is extended or adjusted under 35 U.S.C. 154(b) by 644 days.

(21) Appl. No.: 09/748,085

(22) Filed: Dec. 20, 2000

(65) Prior Publication Data

US 2002/0110147 A1    Aug. 15, 2002

(51) Int. Cl.
*H04L 12/54* (2006.01)

(52) U.S. Cl. ........................... 370/428; 709/203

(58) Field of Classification Search ............... 370/474, 370/428, 61, 475, 389, 395.71, 395.72, 412, 370/413, 415, 417; 709/203, 208, 217, 218, 709/219, 204, 229, 202, 213, 223, 231; 705/26
See application file for complete search history.

(56) References Cited

U.S. PATENT DOCUMENTS

| | | | | |
|---|---|---|---|---|
| 5,706,286 A * | 1/1998 | Reiman et al. | ............ | 370/401 |
| 5,764,899 A * | 6/1998 | Eggleston et al. | ............ | 709/203 |
| 5,956,483 A * | 9/1999 | Grate et al. | ............ | 709/203 |
| 6,052,710 A * | 4/2000 | Saliba et al. | ............ | 709/203 |
| 6,125,352 A * | 9/2000 | Franklin et al. | ............ | 705/26 |
| 6,157,941 A * | 12/2000 | Verkler et al. | ............ | 709/202 |
| 6,161,123 A * | 12/2000 | Renouard et al. | ............ | 709/203 |
| 6,189,098 B1 * | 2/2001 | Kaliski, Jr. | ............ | 713/168 |
| 6,292,833 B1 * | 9/2001 | Liao et al. | ............ | 709/229 |
| 6,324,587 B1 * | 11/2001 | Trenbeath et al. | ............ | 719/310 |
| 6,392,993 B1 * | 5/2002 | Hamilton et al. | ............ | 370/230 |
| 6,442,571 B1 * | 8/2002 | Haff et al. | ............ | 707/201 |
| 6,496,862 B1 * | 12/2002 | Akatsu et al. | ............ | 709/224 |
| 6,625,693 B1 * | 9/2003 | Arora et al. | ............ | 711/125 |
| 6,678,828 B1 * | 1/2004 | Zhang et al. | ............ | 713/201 |
| 6,697,844 B1 * | 2/2004 | Chan et al. | ............ | 709/206 |
| 6,714,964 B1 * | 3/2004 | Stewart et al. | ............ | 709/203 |
| 6,760,748 B1 * | 7/2004 | Hakim | ............ | 709/204 |
| 6,792,085 B1 * | 9/2004 | Rigaldies et al. | ............ | 379/88.13 |

OTHER PUBLICATIONS

Robert Orfali; Dan Harkey; Jeri Edwards, "Client/Server Survival Guide", 1999, pp. 127-201, Third Edition, Publisher: John Wiley & Sons, USA.

(Continued)

*Primary Examiner*—Phirin Sam
(74) *Attorney, Agent, or Firm*—Blakely, Sokoloff, Taylor & Zafman LLP

(57) ABSTRACT

A lightweight store and forward architecture allows packets of data to be forwarded from an application running on a client system to a server system. An application that generates information in response to an event or other condition assembles a packet that includes a target identifier and data to be sent to the target. The packet is stored in a file in the client system. A messaging client forwards packets from the file to a messaging server on a target server system. The messaging server dispatches the information to a messaging handler to process the information. Thus, the application generating the packet is not required to handle network communications related to the packet and registration of a target application is not required.

14 Claims, 3 Drawing Sheets

OTHER PUBLICATIONS

L. Bellissard, N. De Palma, A. Freyssinet, M. Herrmann, S. Lacourte, "An Agent Platform for Reliable Asynchronous Distributed Programming", Proceedings of the 18th IEEE Symposium on Reliable Distributed Systems, 1999, pp. 294-295.

M. Mazer, C. Brooks, "Writing the Web While Disconnected", IEEE Personal Communications, vol. 55, Oct. 1998, pp. 35-46, title page, 1.

* cited by examiner

TECHNIQUES FOR STORING DATA ON MESSAGE QUEUING MIDDLEWARE SERVERS WITHOUT REGISTRATION OF THE SENDING APPLICATION

FIELD OF THE INVENTION

The invention relates to network communications. More specifically, the invention relates to techniques for storing data on a middleware server.

BACKGROUND OF THE INVENTION

Store and forward message systems are commonly used for many applications, for example, electronic mail. Commercially available store and forward software applications include Message Queue Server from Microsoft Corporation of Redmond, Washington and the MQSeries of products available from International Business Machines of Armonk, N.Y.

These store and forward applications typically operate by an application that is sending a message establishing a connection with a server or other device that is to receive the message. These types of store and forward applications require substantial network, disk and memory resources. One reasons that the network, disk and memory resources are consumed by store and forward applications is that a complete application program interface (API) is included in each application that provides store and forward functionality.

The store and forward application API is typically a full-function API that provides a specific method prescribed by a computer operating system or by another application program by which a programmer writing an application program can make requests of the operating system or another application. The full-function API allows an application to provide store and forward functionality. However, in some situations a full-function store and forward API requires an unnecessarily large portion of available resources.

BRIEF DESCRIPTION OF THE DRAWINGS

The invention is illustrated by way of example, and not by way of limitation, in the figures of the accompanying drawings in which like reference numerals refer to similar elements.

DETAILED DESCRIPTION

Techniques for storing data on message queuing middleware servers without registration of the sending application are described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

A lightweight store and forward architecture allows packets of data to be forwarded from an application running on a client system to a server system. An application that generates information in response to an event or other condition assembles a packet that includes a target identifier and data to be sent to the target. The packet is stored in a file in the client system. A messaging client forwards packets from the file to a messaging server on a target server system. The messaging server dispatches the information to a messaging handler to process the information. Thus, the application generating the packet is not required to handle network communications related to the packet and registration of a target application is not required.

Lightweight store and forward messaging is particularly useful in situations where small messages are passed in a single direction (e.g., client to server). For example, in a network of electronic devices (e.g., computer systems, printers, facsimile machines) particular operating events may be of interest to a remote management device. In response to one of these events, the networked devices can generate packets that include event information that are forwarded to the managing device. The managing device can respond to the events in response to receiving the packets identifying and/or describing the events. Lightweight store and forward messaging can be used in other situations or can be used in a bidirectional manner.

Figure 1:
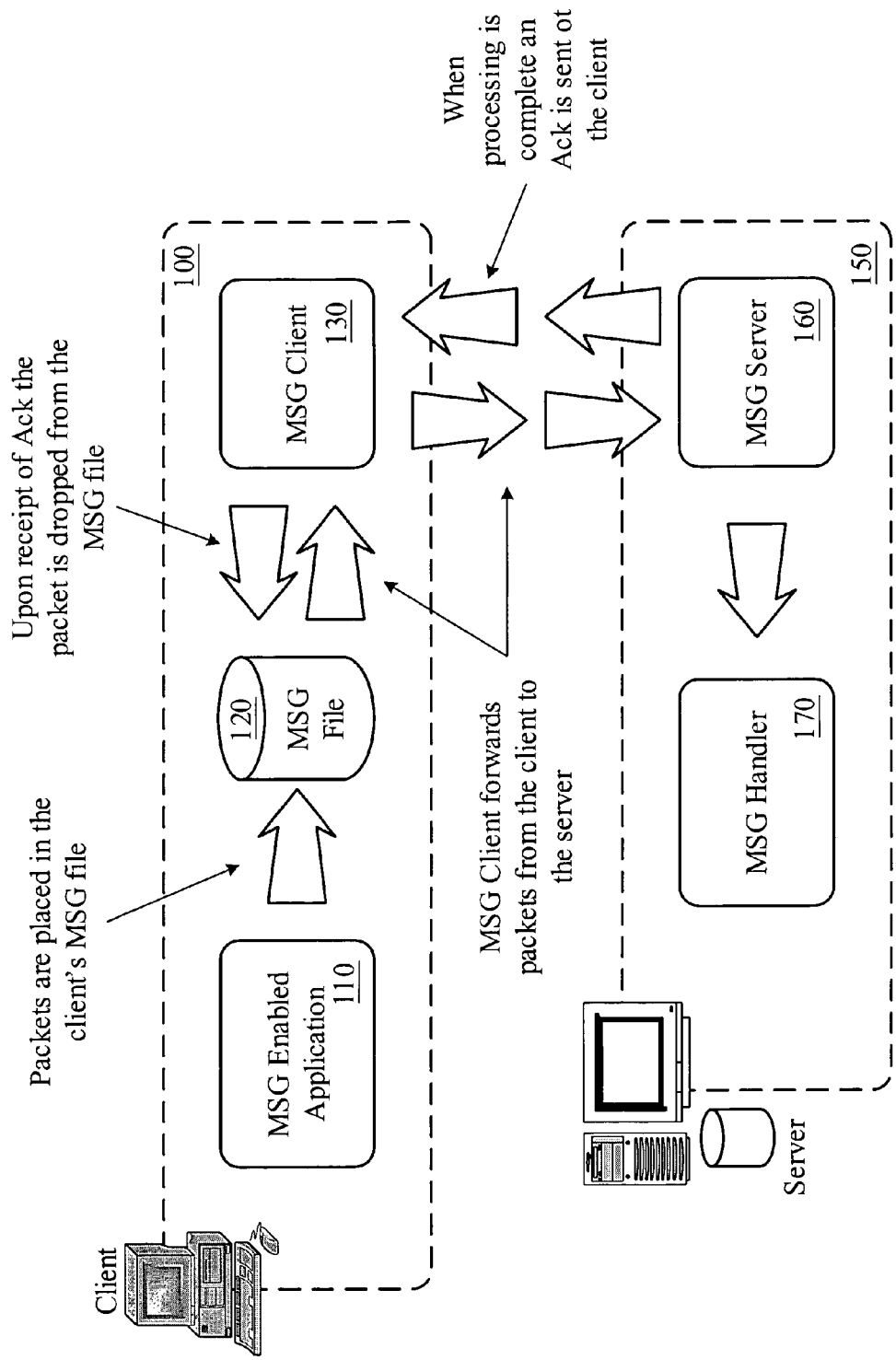
FIG. 1 is a conceptual illustration of one embodiment of a client and server coupled to provide a lightweight store and forward message queuing architecture.

FIG. 1 is a conceptual illustration of one embodiment of a client and server coupled to provide a lightweight store and forward message queuing architecture. FIG. 1 illustrates a single application running on client 100; however, any number of applications can run on client 100 and forward messages in a similar manner.

Client 100 can be any type of electronic system, for example, a computer system, a set top box, a personal digital assistant (PDA). Similarly, server 150 can also be any type of electronic system. A block diagram of an electronic system is described below with respect to FIG. 2.

Client 100 includes messaging (MSG) enabled application 110. MSG enabled application can be any type of application that supports store and forward messaging as described herein. Client 100 also includes MSG file 120 and MSG client 130. Server 150 includes MSG server 160 and MSG handler 170. MSG enabled application 110, MSG file 120, MSG client 130, MSG server 160 and MSG handler 170 can be implemented as any combination of hardware and/or software in any manner known in the art.

When MSG enabled application 110 generates information that is to be sent to server 150, the information is encoded as a packet and the packet is stored in MSG file 120. The information stored in the packet can represent any type of electronic information. For example, execution errors or other events can generate a packet of information describing the nature and/or consequences of the event.

In one embodiment, MSG enabled application 110 acquires exclusive access to MSG file 120 for purposes of writing the packet to MSG file 120. After the packet is written the MSG file 120, the exclusive access is relin quished. In one embodiment, the packet takes the following form:

TABLE 1

MSG packet format

| Parameter | Format |
|---|---|
| Target ID | 32-bit unsigned integer |
| Length | 16-bit unsigned integer |
| Packet Data | Variable length binary data |

In the embodiment of Table 1, the TargetID is a 32-bit value that represents the ultimate target of the packet. In alternate embodiments a different length value can be used as the TargetID. In the embodiment of Table 1, the Length is a 16-bit value representing the length, in bytes, of the data carried by the packet. Use of a 16-bit length value limits the packet data length to 65,535 bytes. In alternate embodiments a different value can be used to designate the packet data length if a different packet length limit is desired. Packet data represents the information carried by the packet.

MSG client 130 forwards packets stored in MSG file 120 to MSG server 160. In one embodiment, packets are forwarded using TCP/IP; however, any appropriate protocol known in the art can be used. Because MSG client 130 handles forwarding of packets, MSG enabled application 110 is required only to assemble packets and store the packets in MSG file 120. MSG client 130 coordinates network communications. This frees MSG enabled application 110 to continue execution without being constrained by network communications.

Additional advantages of the client side architecture of FIG. 1 is that the API included in MSG enabled application 110 is smaller and less complex that an API required for traditional store and forward messaging and the ultimate target of the packet is not required to be registered with the application that generates the target.

When a network connection is established between MSG client 130 and MSG server 160, MSG client 130 forwards the packet from MSG file 120. Upon receiving the packet, MSG server 160 dispatches the information stored in the packet to MSG registered handler 170. Multiple MSG handlers can exist to process different types of information or events that are stored in packets. In one embodiment, MSG handler 170 is a dynamic linked library (DLL) that is loaded based on a TargetID of a packet. The DLL then processes the packet data. Other techniques for processing the packet data can also be used.

When the packet data is dispatched to MSG handler 170, MSG server 160 sends an acknowledge (ACK) message to MSG client 130 identifying the packet that has been dispatched. Upon receipt of the ACK message MSG client 130 drops the packet from MSG file 120. In one embodiment, the dispatched packet is replaced by a null packet in MSG file 120 and, periodically, null packets are removed and the memory reclaimed. Dropping packets from MSG file 120 can be accomplished by other techniques as well.

Figure 2:
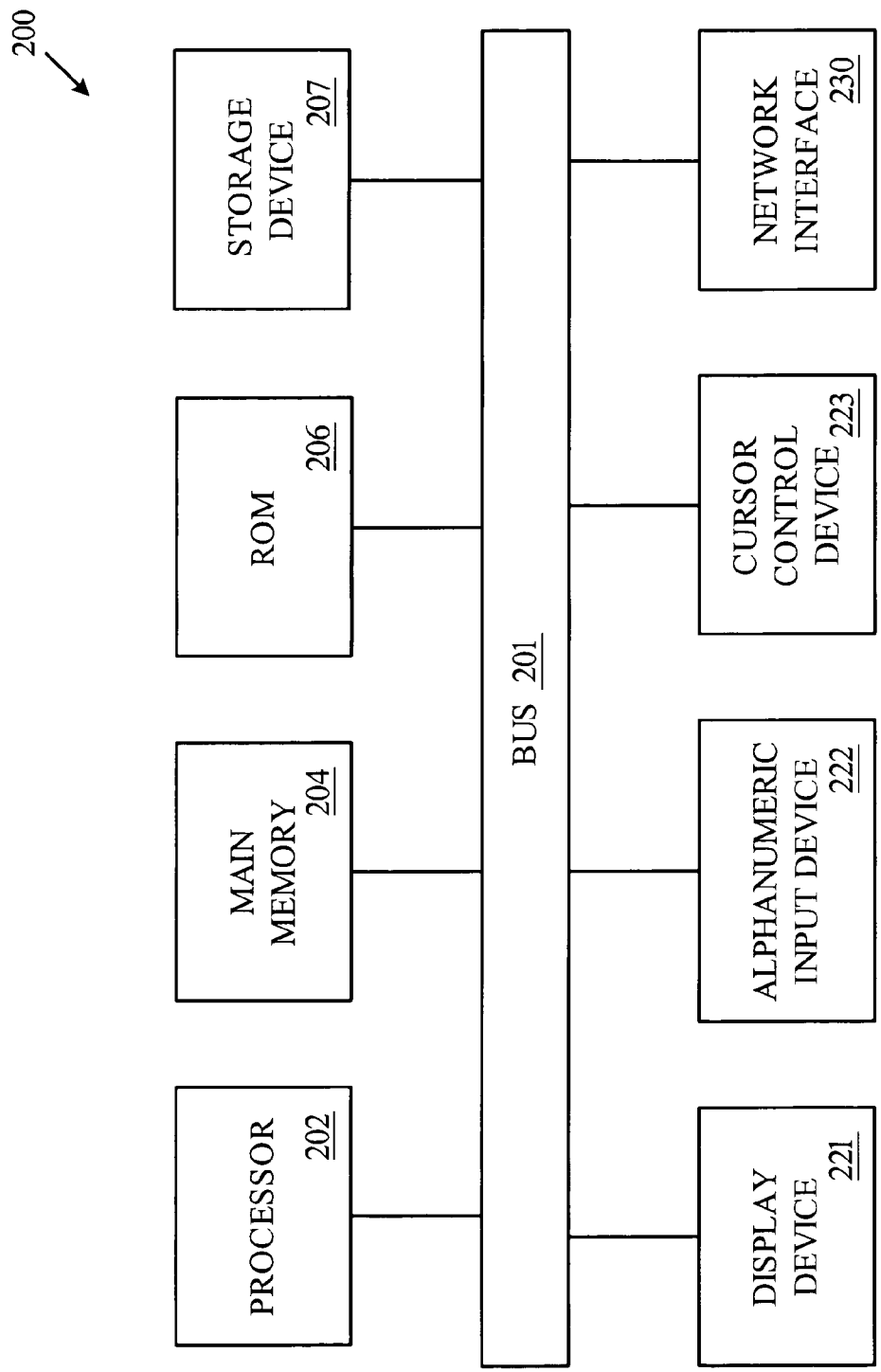
FIG. 2 is a block diagram of an electronic system.

FIG. 2 is a block diagram of an electronic system. The electronic system illustrated in FIG. 2 is intended to represent a range of electronic systems, for example, computer systems, set top boxes, PDAs. Alternative electronic systems can include more, fewer and/or different components.

Electronic system 200 includes bus 201 or other communication device to communicate information, and processor 202 coupled to bus 201 to process information. While electronic system 200 is illustrated with a single processor, electronic system 200 can include multiple processors and/or co-processors. Electronic system 200 further includes random access memory (RAM) or other dynamic storage device 204 (referred to as main memory), coupled to bus 201 to store information and instructions to be executed by processor 202. Main memory 204 also can be used to store temporary variables or other intermediate information during execution of instructions by processor 202.

Electronic system 200 also includes read only memory (ROM) and/or other static storage device 206 coupled to bus 201 to store static information and instructions for processor 202. Data storage device 207 is coupled to bus 201 to store information and instructions. Data storage device 207 such as a magnetic disk or optical disc and corresponding drive can be coupled to electronic system 200.

Electronic system 200 can also be coupled via bus 201 to display device 221, such as a cathode ray tube (CRT) or liquid crystal display (LCD), to display information to a computer user. Alphanumeric input device 222, including alphanumeric and other keys, is typically coupled to bus 201 to communicate information and command selections to processor 202. Another type of user input device is cursor control 223, such as a mouse, a trackball, or cursor direction keys to communicate direction information and command selections to processor 202 and to control cursor movement on display 221. Electronic system 200 further includes network interface 230 to provide access to a network, such as a local area network.

Instructions are provided to memory from a storage device, such as magnetic disk, a read-only memory (ROM) integrated circuit, CD-ROM, DVD, via a remote connection (e.g., over a network via network interface 230) that is either wired or wireless, etc. In alternative embodiments, hard-wired circuitry can be used in place of or in combination with software instructions to implement the present invention. Thus, the present invention is not limited to any specific combination of hardware circuitry and software instructions.

A machine-accessible medium includes any mechanism that provides (i.e., stores and/or transmits) information in a form readable by a machine (e.g., a computer). For example, a machine-accessible medium includes read only memory (ROM); random access memory (RAM); magnetic disk storage media; optical storage media; flash memory devices; electrical, optical, acoustical or other form of propagated signals (e.g., carrier waves, infrared signals, digital signals); etc.

Figure 3:
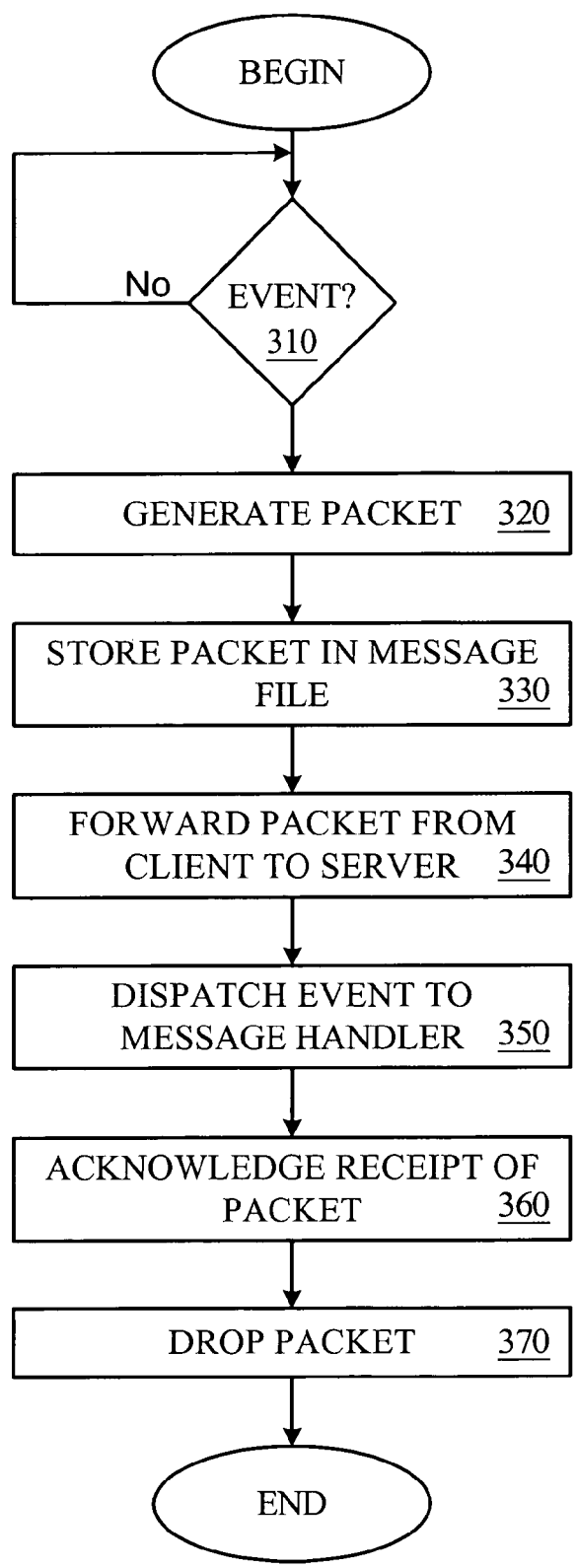
FIG. 3 is a flow diagram of one embodiment of lightweight store and forward message queuing.

FIG. 3 is a flow diagram of one embodiment of lightweight store and forward message queuing. The flow of FIG. 3 is described with respect to an event; however, messages can be generated in response to any type of condition. Events are detected at 310. In one embodiment, events are predetermined operating conditions; however, any type of condition can be detected at 310.

A packet is generated in response to the event at 320. In one embodiment, the packet is generated by an application that detects the event. In an alternate embodiment, an application can detect the even and cause another application (e.g., an operating system) to generate the packet.

The packet is forwarded to a MSG file at 330. In one embodiment, the application generating the packet stores the packet in the MSG file and continues operation, if possible. Because the application is only stores the packet in the MSG file on the same electronic device as the application is running, the API for message forwarding that is included in the application is much smaller than a full function store and forward API.

A messaging client application monitors the MSG file for addition of new packets and, at 340, forwards the packet(s) to a messaging server. The messaging client handles all network communications thus relieving the application of network communications related to the event that has been detected. The messaging server receives the packet form the messaging client via a network connection.

The messaging server dispatches the event to a messaging handler at 350. The messaging handler processes the information included in the packet that is related to the detected event to cause the server electronic system to take a predetermined action. In one embodiment the messaging handler is a DLL that is invoked in response to a predetermined TargetID carried by a packet. In alternate embodiments, the packet can be processed in a different manner.

At 360, the messaging server generates an acknowledge message in response to dispatching the packet to the messaging handler. The messaging client drops the packet from the MSG file, at 370, in response to the acknowledge message from the messaging server.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

What is claimed is:

1. A method comprising:
   generating a packet having a target identifier with a local application in response to an event;
   storing the packet locally in a packet file;
   forwarding the packet from the packet file with a local client messaging application to a server messaging application on a server via a network connection managed by the client messaging application; and
   dispatching the packet with the server messaging application to a messaging handler on the server to process the packet, wherein the messaging server application selects the messaging handler from a plurality of messaging handlers based on the target identifier.

2. The method of claim 1 wherein the packet includes a variable length data field.

3. The method of claim 1 further comprising:
   generating an acknowledge message in response to the packet being dispatched to the messaging handler; and
   communicating the acknowledge message from the messaging server application to the messaging client application.

4. The method of claim 3 wherein further comprising dropping the packet from the local storage in response to the acknowledge message being received by the messaging client application.

5. An article comprising a machine-accessible medium to provide machine-readable instructions that, when executed, cause one or more electronic systems to:
   generate a packet having a target identifier with a local application in response to an event;
   store the packet locally in a packet file;
   forward the packet from the packet file with a local client messaging application to a server messaging application on a server via a network connection managed by the client messaging application; and
   dispatch the packet with the server messaging application to a messaging handler on the server to process the packet, wherein the messaging server application selects the messaging handler from a plurality of messaging handlers based on the target identifier.

6. The article of claim 5 wherein the packet includes a variable length data field.

7. The article of claim 5 further comprising sequences of instructions that, when executed, cause the one or more electronic systems to:
   generate an acknowledge message in response to the packet being dispatched to the messaging handler; and
   communicate the acknowledge message from the messaging server application to the messaging client application.

8. The article of claim 7 wherein further comprising sequences of instructions that, when executed, cause the one or more electronic systems to drop the packet from the local storage in response to the acknowledge message being received by the messaging client application.

9. A computer data signal embodied in a data communications medium shared among a plurality of network devices comprising sequences of instructions that, when executed, cause one or more electronic systems to:
   generate a packet having a target identifier with a local application in response to an event;
   store the packet locally in a packet file;
   forward the packet from the packet file with a local client messaging application to a server messaging application on a server via a network connection managed by the client messaging application; and
   dispatch the packet with the server messaging application to a messaging handler on the server to process the packet, wherein the messaging server application selects the messaging handler from a plurality of messaging handlers based on the target identifier.

10. The computer data signal of claim 9 wherein the packet includes a variable length data field.

11. The computer data signal of claim 9 further comprising sequences of instructions that, when executed, cause the one or more electronic systems to:
    generate an acknowledge message in response to the packet being dispatched to the messaging handler; and
    communicate the acknowledge message from the messaging server application to the messaging client application.

12. The computer data signal of claim 11 wherein further comprising sequences of instructions that, when executed, cause the one or more electronic systems to drop the packet from the local storage in response to the acknowledge message being received by the messaging client application.

13. A network architecture comprising:
    a client electronic system having one or more processors to run one or more programs and a memory system coupled to the processor, the memory system to store, in a packet file having a target identifier, one or more message packets generated by a local application, wherein the one or more processors also runs a messaging client that forwards message packets stored in the memory system; and
    a server electronic system coupled to the client electronic system, the server electronic system having one or more processors to run one or more programs in a memory system coupled to the processor, wherein the one or more processors runs a messaging server that receives forwarded messages from the messaging client and dispatches the forwarded messages to a messaging handler on the server to process the messages, wherein the messaging server selects the messaging handler from a plurality of messaging handlers based on the target identifier.

14. The network architecture of claim 13 further comprising a second client electronic system, coupled to the server electronic system, having one or more processors to run one or more programs and a memory system coupled to the processor, the memory system to store one or more message packets, wherein the one or more processors also runs a messaging client that forwards message packets stored in the memory system, and further wherein the one or more processors of the server electronic system runs a messaging server that receives forwarded messages from the messaging client of the second client electronic system and dispatches the forwarded messages to a messaging handler on the server to process the messages.

* * * * *